United States Patent [19]

Leighton

[11] Patent Number: 4,822,974
[45] Date of Patent: Apr. 18, 1989

[54] LASER HOLD DRILLING SYSTEM WITH LENS AND TWO WEDGE PRISMS INCLUDING AXIAL DISPLACEMENT OF AT LEAST ONE PRISM

[75] Inventor: Robert L. Leighton, Ellington, Conn.

[73] Assignee: United Technologies Corporation, Hartford, Conn.

[21] Appl. No.: 157,018

[22] Filed: Feb. 18, 1988

[51] Int. Cl.[4] .................. B23K 26/06; B23K 26/00; B23K 26/08; G02B 5/04

[52] U.S. Cl. .................. 219/121.67; 350/484; 350/6.4; 350/287; 350/574; 219/121.73; 219/121.8

[58] Field of Search ........... 219/121.6, 121.61–121.74, 219/121.76–121.8; 350/484, 6.4, 287, 574, 421, 447

[56] References Cited

U.S. PATENT DOCUMENTS

| 3,378,687 | 4/1968 | Schepler ........................ 350/6.4 |
| 3,514,619 | 5/1970 | Ireland ......................... 350/484 |
| 3,576,965 | 5/1971 | Gugger ......................... 219/121 |
| 3,720,454 | 3/1973 | Inderhees ...................... 350/6.4 |
| 3,827,787 | 8/1974 | Ripart .......................... 350/484 |
| 4,079,230 | 3/1978 | Miyauchi et al. ................ 219/121 |
| 4,118,109 | 10/1978 | Crawford et al. ............... 350/285 |
| 4,160,894 | 7/1979 | Stemmler et al. ................ 219/121 |
| 4,190,759 | 2/1980 | Hongo et al. .................. 219/121.78 |
| 4,348,108 | 9/1982 | Shindow ........................ 350/6.4 |

FOREIGN PATENT DOCUMENTS

| 057164 | 1/1982 | European Pat. Off. . |
| 1905449 | 10/1967 | Fed. Rep. of Germany ...... 350/484 |
| 53-140699 | 12/1978 | Japan ......................... 219/121.8 |
| 57-100890 | 6/1982 | Japan . |
| 717694 | 2/1980 | U.S.S.R. ...................... 350/484 |

Primary Examiner—Jon W. Henry
Attorney, Agent, or Firm—Eric W. Petraske

[57] ABSTRACT

A system for drilling or cutting holes with a laser provides for independent control of the beam angle and displacement from the system axis, thereby making it possible to cut truly cylindrical holes.

7 Claims, 2 Drawing Sheets

LASER HOLD DRILLING SYSTEM WITH LENS AND TWO WEDGE PRISMS INCLUDING AXIAL DISPLACEMENT OF AT LEAST ONE PRISM

TECHNICAL FIELD

The field of the invention is that of laser machining, in particular that of drilling shaped holes in a work piece.

BACKGROUND ART

The Conventional method of drilling shaped holes, especially irregularly shaped holes, is the use of electric discharge machining, which works only for conductive work pieces and also requires a consumable electrode. U.S. Pat. No. 4,118,109 illustrates an optical system for controlling the direction of a beam of radiation that uses two coaxial independently rotatable wedge prisms to steer the beam within a cone of predetermined angle. This system does not permit independent control of the beam spot location and angle. This patent also does not refer to focusing the optical beam.

U.S. Pat. No. 4,079,230 illustrates a system for scanning an optical beam across a work piece by using a pair of wedge prisms rotating in opposite directions at the same speed to scan the beam in a straight line across the work piece.

DISCLOSURE OF INVENTION

The invention relates to an optical system for drilling holes in a work piece comprising a pair of rotating prisms separated by a variable distance and a focusing device. A feature of the invention is the ability to control the displacement of the focal spot from the optic axis independently of the angle.

Another feature of the invention is the ability to control the angle of incidence of the focused laser beam on the work independently of the displacement of the focal spot from the axis.

Other features and advantages will be apparent from the specification and claims and from the accompanying drawings which illustrate an embodiment of the invention.

BEST MODE OF CARRYING OUT THE INVENTION

Figure 1:
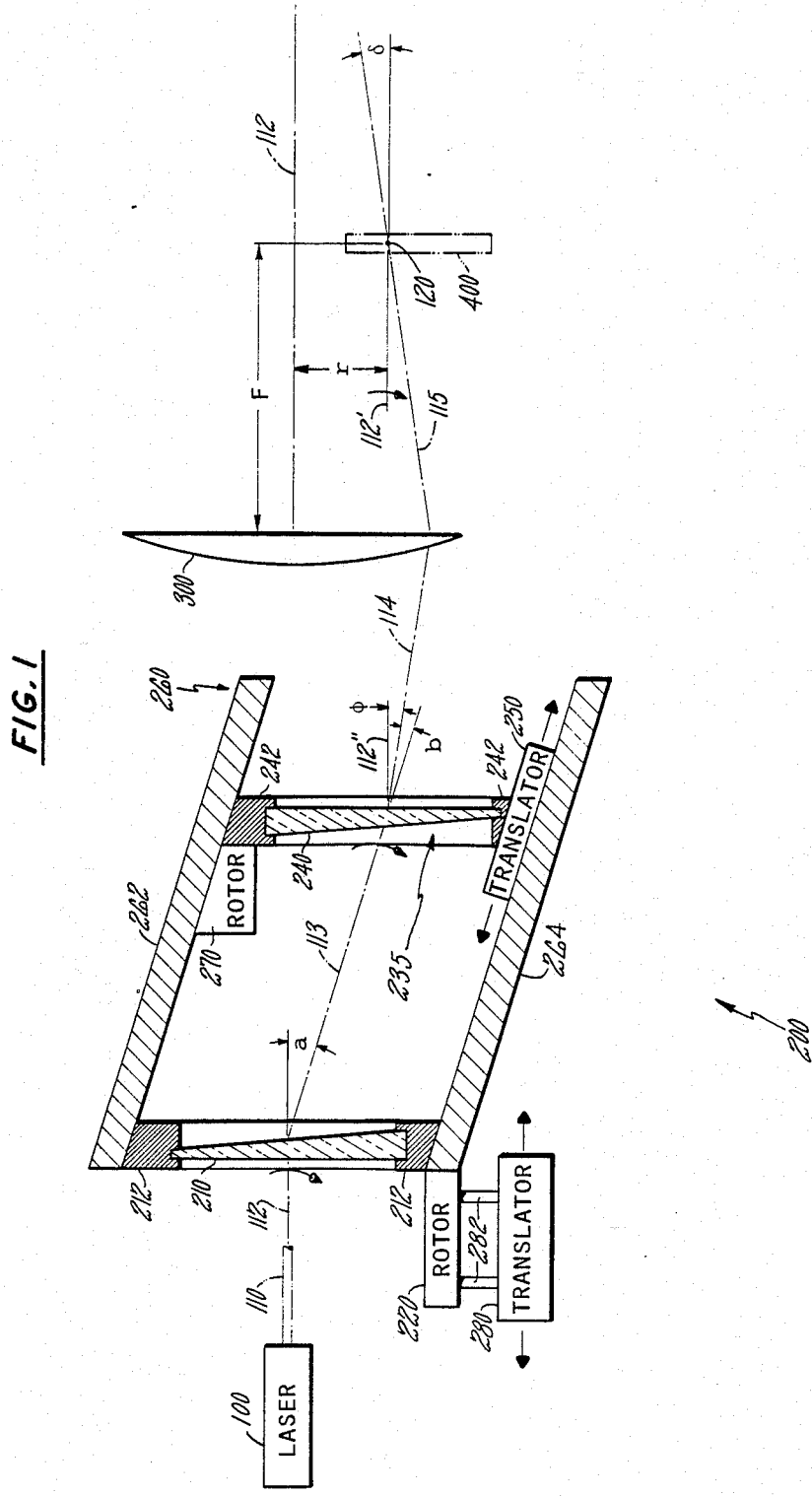
FIG. 1 illustrates in partially pictorial, partially schematic, fashion an embodiment of the invention.

Referring now to FIG. 1, laser 100 generates an optical beam 110 directed along an axis 112. This beam is transformed by an optical system generically referred to by the numeral 200 and then is focused by a lens or mirror indicated by the numeral 300 to a focal spot indicated by the numeral 120 on or in work piece 400.

It is well known in the art that a laser beam when properly focused will melt and/or vaporize the material of the work piece to produce a hole. A stationary focal spot will form a hole by melting the material of the workpiece to a distance transverse to the beam direction that is determined by the conductivity of the work piece. If, however, the hole must be of a particular shape that needs to be at an angle relative to the beam axis or otherwise shaped in a complex fashion, it will be necessary to manipulate the beam in some fashion or to manipulate the work piece. It is preferable to hold the work piece stationary and manipulate the beam when the geometry can be generated more simply by motion of the optical components, as for cylindrical, conical and bi-conical holes.

The optical systems of the prior art are able to steer a beam about a conical surface and thus to cut a conical hole in a relatively thick work piece. Such a system is illustrated in U.S. Pat. No. 4,118,109 in which a pair of wedge prisms may be independently rotated to position the beam anywhere within a conical volume having a half angle equal to the sum of the two deflection angles of the two prisms. This system is unable to control the position where the beam strikes the work piece independently of the angle at which the beam strikes the work piece. In particular, it cannot produce a beam that is parallel to and displaced from the axis of the incident beam. Thus, this system is not able to carve out a cylindrical hole in a work piece.

Referring now to the optical system 200 of FIG. 1, a first prism 210 supported in a rotatable holder 212 deflects beam 110 by an angle a to a new beam direction 113. As indicated by the arrow, holder 212 may be rotated azimuthally about the direction of propagation 112 of beam 110 by a conventional rotor device indicated schematically by a box labeled by the number 220. Rotor 220 includes illustratively a conventional stepping motor or other motor together with an encoding device, if required, to generate a measure of the angle of orientation of prism 210. Such motors and encoders are conventional in the art and many different models are available.

A second prism 240 supported in a holder 242 and indicated generally by the numeral 235 is located a variable distance downstream from prism 210. Holder 242 is supported by fixture 260 which is tilted by an angle a with respect to a plane perpendicular to axis 112. Fixture 260 includes supports 262 and 264 that are rigidly attached to holder 212 and rotate with holder 212 at the same azimuth so that the laser beam traveling along direction 113 will strike the center of prism 240 at any azimuth. Prism 240 will deflect beam 110 by a second angle, labeled b in FIG. 1, to produce a beam traveling at a new angle along axis 114. Axis 114 makes an angle $\phi$ with respect to beam axis 112. Axis 114 may be rotated through a conical surface having half angle b with respect to axis 113 of beam 110 exiting prism 210. At the two extreme values, axis 114 may have an angle (a+b) or (a−b) with respect to axis 112. In the particular case when b=−a, i.e. when prism 240 is oriented 180° with respect to prism 210, beam 114 will be parallel to axis 112, r will be zero, since beam 114 will be focused to the axis at the focal length of lens 300, and beam angle $\delta$ will be a maximum. A particular case relevant to the subject invention is that when beam 115 is parallel to original axis 112, axis 114 must intersect axis 112 at the front focal distance from the lens.

In general, when the direction of the laser beam entering lens 300 is not parallel to the optical axis, the focal spot is displaced from the focal axis an amount approximated by;

$$r = F \text{ (Tangent } \phi\text{)} \tag{1}$$

where F is the focal length of lens 300 and $\phi$ is the angle of axis 114 with respect to axis 112 that is also the axis of the lens 300. The distance along axis 112 from the lens to the focal point is essentially fixed at F, the focal length of the lens, since the oncoming laser beam is collimated.

The orientation of axis 115 depends on the point of intersection of axis 112 of lens 300 and axis 114 of the beam entering the lens. If these axes intersect a distance behind the lens equal to its front focal length, F, the axis of the focused laser beam will be parallel to the optical axis. If the intersection length is less than F, the focused beam axis will diverge from the optical axis. Conversely, if the axes intersect at a distance before the lens greater than F the focused laser beam will converge toward the axis.

Figure 2:
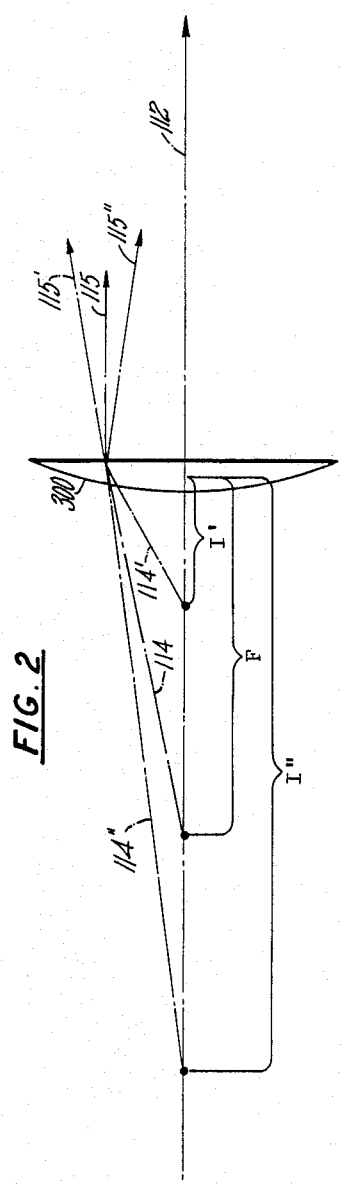
FIG. 2 illustrates variation of the angle of incidence of a beam on a workpiece.

The situations referred to above are illustrated in FIG. 2, showing output beam axis 115 parallel to the axis of lens 300, axis 115' diverging from axis 112 and axis 115" converging toward axis 112. Corresponding distances of the intersection point of the incoming beam 114 and axis 112 are F (the focal length of lens 300), I' (less than F) and I" (greater than F).

For a given focal length lens or lens system the displacement of the focal spot from the optical axis, r, depends on the angle, φ, between the optical axis 12, and the laser beam axis 114. The direction of the focused laser beam, δ, is given as;

$$\text{Tangent } \delta = \frac{(F - I) \text{ Tangent } \phi}{F} \quad (2)$$

An optical system that permits independent variation of the laser beam direction, φ, and the location, I, of the intersection of the laser beam axis 112 with optical axis 114, provides a means of cutting out any three dimensional geometry that can be described with a line of sight along the resulting focused beam axis. This can be achieved as described below.

Figure 3:
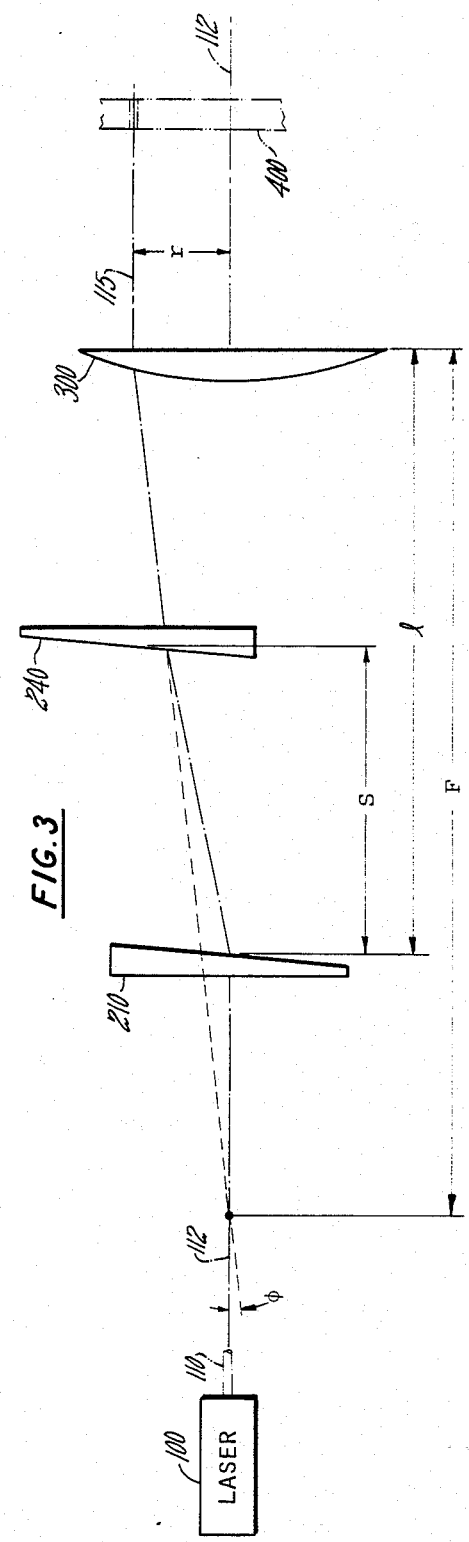
FIG. 3 illustrates a system employing the invention.

FIG. 3 shows in simplified form an embodiment of the invention set up to function as a cylindrical hole trepanner. Laser 100 and focusing lens 300 remain fixed on a single axis. The laser beam passes through two wedge prisms, 210 and 240, before passing through the focusing lens 300. The angle of incidence, φ, of the laser beam 114 on the lens can be varied by rotating prism 240 about the beam axis relative to prism 210 to obtain the desired trepanning radius, r. The space between the prisms, S, can then be varied so that the beam axis 114 intersects the lens 300 at a height, r, from the lens axis resulting in a focused laser beam parallel to the lens axis and separated from it by r. Now, if the pair of prisms, so adjusted, is rotated as a unit by unit rotor 220 about axis 112 while the laser is repeatably pulsed, a hole can be trepanned that is truly cylindrical. By further varying spacing S, or moving the wedge assembly as a unit along the axis relative to the lens it is possible to control the beam angle incident on the focal plane so that convergent or divergent conical holes can be drilled with control of both hole diameter and cone angle. The spacing S may be controlled by translator 250 as described below. The distance l from prism 210 to lens 300 may be adjusted by translator 280, shown schematically in FIG. 1, which may be a milling machine head or any other convenient device that supports the assembly of holder 212 and the supports 260. Rotor 220, mounted on translator 280 may be used to rotate the prism assembly as a whole.

The relative rotation of the two wedges, γ, about the beam axis required to generate a spot in the focal plane at some desired radius r relative to axis 112 is given by the following expression;

$$\gamma = \cos^{-1}\left(\frac{r^2}{2 (F \text{Tan} W)^2}\right) - 1 \quad (3)$$

where:
γ = relative angle of wedge rotation about the beam axis
r = radius of circle in the focal plane
F = focal length of the focusing lens
W = deflection angle of laser beam passing through a single wedge when the wedges have the same W.

To maintain an exit ray in planes passing through the lens axis (meridional) the wedges should be rotated in opposite directions by half the required angle, γ.

With the position of prism 214 fixed, the distance S between prisms required to produce a desired angle δ of the focused beam axis 115 with the lens axis 112 is given by;

$$S = \frac{F^2 \text{Tan}(\delta) + r(F - 1)}{F \text{Tan}(\delta) - r} \quad (4)$$

where:
δ = desired angle
l = location of first wedge from lens.

In order to drill a hole in a work piece at a distance r from the point where axis 112 intersects the workpiece, and along an azimuthal angle θ about axis 112 with respect to some reference direction, such as the plane of the paper in FIG. 3, prism 210 is rotated so that its axis is along angle θ+γ/2 and prism 240 is rotated to an angle θ−γ/2 where γ is given by equation (3). Beam 114 then enters lens 300 at a point R from axis 112 in a plane passing through axis 112 and having the required angle θ with respect to the reference direction. The distance S between prisms 210 and 240 may be adjusted according to equation (4) to direct beam 115 on the work piece at the required angle δ, which will be half the cone angle of the drilled hole.

Translation of unit 235 comprising prism 240, rotor 270 and holder 242 along the direction of axis 113 is provided by a system indicated schematically by the numeral 250 which may be a stepper motor driving a screw or any other conventional system. The angular orientation of prism 240 about axis 113 and thus the angle of axis 114 relative to axis 113 is controlled by unit 270 which is the same as unit 220, namely, a motor controlling a gear drive together with an encoder to read out the orientation of prism 240.

In an illustrative embodiment of the invention, laser 100 is a NdYAG laser; prisms 210 and 240 are made of fused silica and have an angle of 20°; typical distance between the lens and the nearer prism of 1", distance between prisms of 4" and lens focal length of 4".

With a system of FIG. 3, the distance between lens 300 and the focal spot may be varied also by sliding the whole wedge assembly. A bi-conical hole is possible by varying or moving the wedge assembly along the axis relative to the lens. It is possible to control the angle of axis 115 relative to axis 112, which determines the cone angle of a conical hole. A hole having cone angle of 10°, a throat diameter of 0.020" and a throat position of 0.050" from the front surface of the workpiece has been formed in cobalt alloys by rotating prism 240 with respect to prism 210 in order to cut the required conical surface.

If a biconical hole is to be drilled with an entrance radius r and with a throat at a distance T from the surface of the workpiece, which, in turn, is located at a distance F from lens 300, the inter-prism spacing S and distance l from the front prism to lens 300 is given by:

$$C_1 S^2 - C_2(Sl) + 2l^2 = \frac{r^2}{[\tan(w)]^2}\left(\frac{F+T^2}{T}\right)$$

where
$C_1 = 1 + (1 + \cos \gamma)^2 + \sin^2 \gamma$
$C_2 = 1 + \cos \gamma$

The system of FIG. 3 was used with laser 100, prism 210 and lens 300 on the same axis. The value of r was selected by prism motion. Beam 115 was aligned to axis 112 at the correct half-angle of the hole to intersect axis 112 at the desired throat depth T by adjusting prism spacing S. Rotor 220 was used to cut out the holes.

A converging or diverging conical hole could be cut with the same rotation by changing S.

A parallel-sided hole of any cross-sectional shape may be cut by setting r by rotation of prism 240 while simultaneously adjusting S or l so that axis 115 remains parallel to axis 112, and using translator 280 and rotor 220 to map out the outline of the hole in polar coordinates.

It should be understood that the invention is not limited to the particular embodiments shown and described herein, but that various changes and modifications may be made without departing from the spirit and scope of this novel concept as defined by the following claims.

I claim:

1. An optical system for directing a laser beam on a workpiece in a predetermined manner comprising:
   first and second wedge prisms spaced at first and second prism positions along a first axis for serially deflecting said laser beam and having first and second azimuthal orientations, respectively;
   means for rotating said second wedge prism to a predetermined angular position about a second prism axis parallel to said first axis, thereby defining a relative angular position of said first and second wedge prisms;
   a lens, having a focal length and positioned at a predetermined focusing means distance along said first axis, for intercepting said laser beam at an interception distance from said first axis that depends on said relative angular position, and at a predetermined interception angle relative to said first axis after said laser beam has been deflected by said first and second wedge prisms and focusing said laser beam to a predetermined focal position, characterized in that:
   at least one of said first and second prisms is connected to displacement means for displacing said prism parallel to said first axis, whereby at least one of said first and second prism positions may be varied with respect to the other of said first and second prism positions to define a relative prism displacement along said first axis, so that said interception distance may be varied by variation of said relative prism displacement as well as by variation of said relative angular position.

2. An optical system according to claim 1, in which said relative angular position is one hundred eighty degrees so that said predetermined interception angle is substantially zero, whereby said laser beam intercepts said lens substantially parallel to said first axis and said focal position is located along said first axis at a distance from said lens equal to said focal length.

3. An optical system according to claim 1, further characterized in that said second wedge prism is rotated to a predetermined relative angular position and said relative prism displacement is set to a predetermined value such that said laser beam exits from said lens parallel to said first axis at a predetermined offset distance therefrom.

4. An optical system according to claim 3, further including unit rotation means for rotating said first and second wedge prisms as a unit about said first axis, whereby said focal position of said laser beam may be used to trepan a cylindrical hole centered on said first axis.

5. An optical system according to claim 4, further including unit translation means for translating said first and second wedge prisms as a unit along said first axis, whereby a parallel-sided hole may be cut in a workpiece by repeated adjustment of said unit rotation means and unit translation means.

6. An optical system according to claim 1, further including unit rotation means for rotating said first and second wedge prisms as a unit about said first axis and being adapted to cut a conical hole having a predetermined cone angle in a workpiece, in which said relative angular position and said relative prism displacement are set to predetermined values such that said laser beam intersects said first axis at a predetermined angle that is half said cone angle and at a predetermined focal position located along said axis at a throat position of said conical hole, whereby said conical hole may be cut by rotation of said unit rotor.

7. An optical system according to claim 1, further including unit translation means for translating both said wedge prisms as a unit along said first axis, whereby holes may be machined in a workpiece having a variable distance along said first axis as well as a variable displacement from said first axis and a variable angle of intersection with said axis by manipulation of: the distance from the further of said wedge prisms to said lens; said relative prism displacement; and said relative angular position.

* * * * *